United States Patent [19]

Flöter

[11] 4,084,244
[45] Apr. 11, 1978

[54] ELECTRICAL DUPLICATING CONTROL APPARATUS

[75] Inventor: Wilfried Flöter, Erlangen, Germany

[73] Assignee: Siemens Aktiengesellschaft, Munich, Germany

[21] Appl. No.: 725,732

[22] Filed: Sep. 23, 1976

[30] Foreign Application Priority Data

Sep. 30, 1975 Germany .............................. 2543629
Aug. 20, 1976 Germany .............................. 2637631

[51] Int. Cl.² ................... B23Q 35/123; G05B 19/36
[52] U.S. Cl. .................................. 364/474; 318/571; 318/578; 364/117
[58] Field of Search ............ 235/151.11, 151.1; 318/567, 570, 571, 575, 578

[56] References Cited

U.S. PATENT DOCUMENTS

| | | | |
|---|---|---|---|
| 3,609,322 | 9/1971 | Burnett et al. ................... | 235/151.11 |
| 3,667,023 | 5/1972 | Sommeria ........................... | 318/578 |
| 3,707,662 | 12/1972 | Hoffman ............................ | 318/578 |
| 3,715,646 | 2/1973 | Wise .................................. | 318/578 |
| 3,743,910 | 7/1973 | Wise .................................. | 318/578 |
| 3,764,877 | 10/1973 | Meyer ............................... | 318/578 |
| 3,870,871 | 3/1975 | Nead ............................. | 235/151.11 |

*Primary Examiner*—Felix D. Gruber
*Attorney, Agent, or Firm*—Kenyon & Kenyon, Reilly, Carr & Chapin

[57] ABSTRACT

An electrical duplicating control apparatus, in particular a duplicating milling machine, having a sensing stylus which can be deflected in three dimensions with three sensing systems in which the amount of spatial deflection of the sensing stylus is held constant by means of a deflection control acting on the feed rate control and in which the sensing stylus deflection and the travel velocity can be varied independently of each other.

9 Claims, 10 Drawing Figures

ELECTRICAL DUPLICATING CONTROL APPARATUS

BACKGROUND OF THE INVENTION

Field of the Invention

This invention relates to electrical duplicating control apparatus, in general and more particularly to an improved control apparatus for duplicating milling machines.

Such apparatus comprising a sensor which scans a model mechanically and has a sensing stylus and coil systems operating orthogonally to each other as the sensing systems, with the output voltages of the sensing systems used to derive velocity control signals for the feed drives in the individual machines axes, and also includes a device which feeds appropriate correction signals to the feed drives for maintaining a predetermined amount of deflection of the sensing stylus is described in German Auslegeschrift No. 1,552,554. In the disclosed device, the velocity (rate) control signals are proportional to the output voltages of the sensing systems. Therefore, there is no possibility of changing the amounts of predetermined sensing stylus deflection and resultant feed velocity independently of each other. Any change of the predetermined amount of sensing stylus deflection also changes the resultant feed velocity. Independently changing the sensing stylus deflection and the feed velocity is important particularly if repeated machining of the same work piece at different distances from the final contour is desired without having to exchange the sensing stylus for another one with a different offset dimension.

Since in the known duplicating control apparatus, only two dimensional deflection of the sensing stylus is provided, the transversal deflection is not picked up if model surfaces not perpendicular to the deflection plane are scanned, and therefore, the dimensional correctness of the work piece is not assured.

SUMMARY OF THE INVENTION

It is an object of the present invention to ensure, with simple means, the dimensional correctness in apparatus of the type mentioned above even where arbitrarily oriented model contours are scanned and to leave the feed velocity uninfluenced by the sensing stylus deflection if the predetermined amount of the latter is changed in any manner.

According to the present invention, this object is attained by providing three sensing systems which operate in mutually orthogonal directions; by providing a first vector analyzer which forms voltages proportional to the respective cosine of the direction angles of the spatial deflection vector with respect to three mutually orthogonal machine axes as well as to the magnitude of the spatial deflection vector from the output voltages of the three sensing systems; by feeding the magnitude of the spatial deflection vector as the actual value to a deflection control and the output of the latter to the inputs of two multipliers which form the correction variables and the other inputs of which are connected to two outputs of the first vector analyzer; by feeding the output voltages of the sensing systems which operate in the $\bar{x}\bar{y}$ plane formed by the $x$ and $y$ feed directions, to a second vector analyzer, the output voltages of which, corresponding to the angle functions of the deflection angle in this plane, multiplied by a quantity proportional to the amount of the predetermined feed velocity, form the velocity control signals.

In the electrical duplicating control apparatus according to the present invention, the amounts of sensing stylus deflection and of the travel velocity are held constant and can be varied independently of each other because of the separate processing of the magnitude and the direction of the spatial sensing stylus deflection. The ability to change the magnitude of the sensing stylus deflection and the travel velocity independently allows repeated milling of the same work piece, e.g., roughing and finishing, without the need to exchange the sensing stylus. With constant dimensions of the sensing stylus, the dimensional correctness of the work piece is ensured by holding the deflection perpendicular to the model surface constant.

An inexpensive and, in view of the manufacturing tolerances of the components used, rather accurately working design of the first vector analyzer is obtained, according to a further feature of the present invention, with a first vector analyzer consisting of three dividers, to the dividend inputs of which voltages proportional to the sensing stylus deflections are fed and the squared output voltages of which are added and compared with a constant quantity at the input of a proportional integral controller, the output variable of which acts on the divisor inputs of the dividers.

According to a further feature of the present invention, it is advantageous if the velocity control signals and the corresponding correction signals are fed as reference values to the feed velocity controllers.

With the duplicating control apparatus according to the present invention, one can run with a constant resultant feed velocity even if duplicating in a duplicating plane which encloses an angle of rotation to the plane formed by two axis-parallel feed directions. For this purpose, a further feature of the invention provides that a computing circuit, having as an input a voltage giving the desired angle of rotation, is associated with the second vector analyzer, and that an angle-of-rotation controller is provided for correcting the direction angle of the velocity vector. This controller has as its reference value input a voltage giving the tangent of the desired angle of rotation and, as its actual value input, the quotient, formed in a divider, of two feed velocities. The output voltage of the latter is also connected to one of the two velocity controllers. With the rotation of coordinates, as provided with this further feature of the present invention, the computing circuit ensures that, even when duplicating in a duplicating plane rotated by a predetermined angle of rotation, the deflection angle is perpendicular to the velocity vector. In order to ensure that the direction of the velocity vector is maintained even in the case of inaccuracies of the computing circuit, an angle-of-rotation controller takes appropriate corrective actions.

DETAILED DESCRIPTION OF THE INVENTION

Figure 1:
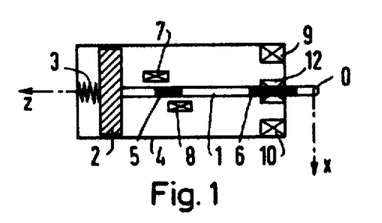
FIG. 1 is a longitudinal cross section through a sensor used in the apparatus of the present invention.
Figure 2:
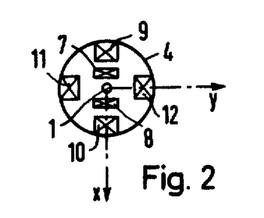
FIG. 2 is a front view of the housing of the sensor of FIG. 1.

FIG. 1 shows schematically a longitudinal cross section through an inductive sensor. A sensing stylus is fastened to a plate 2 which is biased by a spring 3 against the bottom of a housing 4 and can move with a minimum of friction along the central axis $z$ of the latter. The sensing stylus 1 has sections 5 and 6 of increased magnetic permeability, with which inductively operating sensing systems are associated. The sensing systems consist of coils 7 and 8 for picking up deflections of the sensing stylus 1 in the $z$ direction, coils 9 and 10 for picking up deflections of the sensing stylus 1 in the $x$ direction, and coils 11 and 12 for picking up deflections of the sensing stylus 1 in the $y$ direction. The coils 11 and 12 can be better seen in the front view of the housing 4 shown in FIG. 2. The $x$, $y$ and $z$ directions are perpendicular to each other and thus form a Cartesian coordinate system, the coordinate origin 0 which is referred, for instance, to the center of the head of the sensing stylus 1 when the latter is in the undeflected condition. The housing 4 is rigidly coupled to a machining tool, so that the coordinate origin 0 follows all movements of the tool. If the sensing stylus is deflected in the $x$ direction or the $y$ direction, it is stressed in flexure, while it is stressed in compression if deflected in the $z$ direction. In case of a deflection in the $z$ direction, the spring 3 is compressed accordingly. In case of a deflection in any of the three possible deflection directions, the center of the head of the sensing stylus moves away from the coordinate origin by a corresponding distance.

Figures 3, 4:
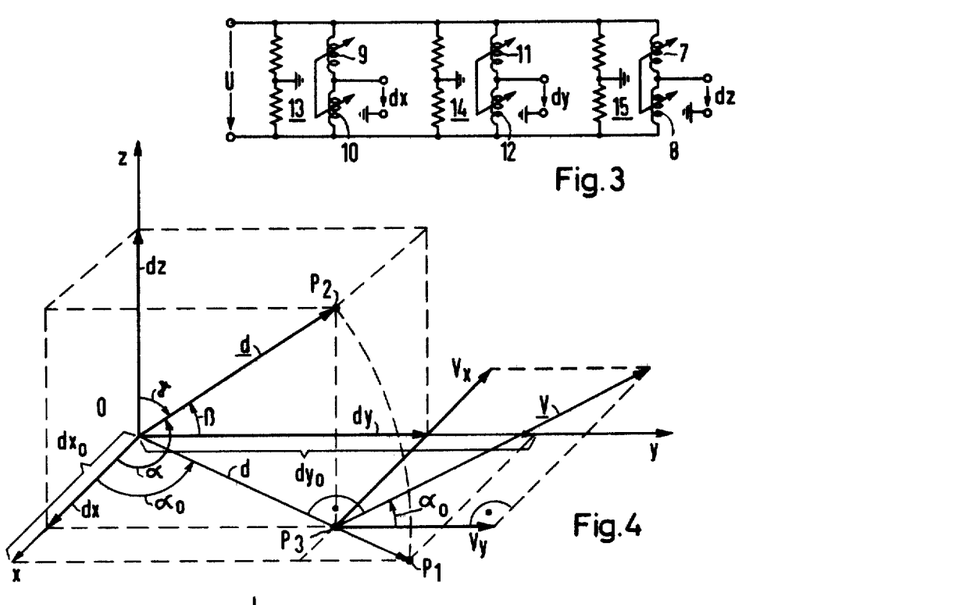
FIG. 3 is an electrical circuit diagram of the sensor of FIGS. 1 and 2.
FIG. 4 is a vector diagram helpful in understanding the operation of the present invention.

As shown in FIG. 3, the coils 7 and 8, 9 and 10 and 11 and 12 form respective bridge arms of a-c bridge circuits 13, 14 and 15, respectively. In case of a deflection in one of the three axes $x$, $y$, $z$, the coil inductances associated with these deflection directions are changed in opposite senses and the associated bridge circuit is thereby unbalanced. Since the axes $x$, $y$ and $z$ are in the feeding directions of the machine, the bridge output voltages proportional to the individual deflections are a measure of the sensing stylus deflection in the respective feeding direction. The bridge output voltages are therefore designated as $dx$, $dy$, $dz$, corresponding to the deflection components. The square root of the sum of the squares of the three bridge output voltages, rectified with the correct phase, corresponds to the total three dimensional deflection of the sensing stylus 1. It is advisable to match the modulus of elasticity of the sensing stylus 1 and the spring constant of the spring 3 in such a manner that equal forces produce the same bridge output voltages in each deflection direction.

FIG. 4 shows a vector diagram to explain the principles of the duplicating control apparatus according to the present invention. The intersection point of the three orthogonal axes $x$, $y$ and $z$ of the sensing stylus 1, to which corresponding feeding directions of the tool are assigned, represents the coordinate origin 0. This coordinate origin 0 coincides, as was explained in connection with FIG. 1, with the center of the head of the sensing stylus 1 in the undeflected position of the latter. It will now be assumed that outline milling is to be performed in the $x$-$y$ plane. There is initially to be no deflection of the sensing stylus in the $z$ direction, i.e., no initial transversal deflection. According to the model contour, the sensing stylus deflection in the $x$ direction is then obtained as $dx_o$ and in the $y$ direction as $dy_o$. The deflection vector $OP_1$ has the magnitude $d$. The deflection vector $OP_1$ is normal to the model contour and lies in the $x$-$y$ plane. The velocity components $V_x$ and $V_y$ which are to be delivered to the feed drives are to be given values such that the resultant velocity vector $V^*$ has a predetermined magnitude and is perpendicular to the deflection vector $OP_1$. Therefore, the relations (1) and (2) must hold:

$$V_x = -V^* \sin \alpha_o \quad (1)$$

$$V_y = V^* \cos \alpha_o \quad (2)$$

where $\alpha_o$ is the angle between the vector $OP_1$ lying in the $x$-$y$ plane and the $x$ axis.

If an additional deflection of the sensing stylus in the direction of the $z$ axis of the magnitude $dz$ now takes place, the deflection vector occupies the position $OP_2$. Under the assumption that the magnitude of the resultant deflection is kept constant, nothing changes for the velocity components $V_x$ in the $x$ direction and $V_y$ in the $y$ direction, because the resultant feeding velocity is perpendicular to the projection $OP_3$ of the new deflection vector $OP_2$ in the $x$-$y$ plane, and is therefore also perpendicular to $OP_2$. To preserve contour fidelity, the deflections in the $x$ direction and the $y$ direction must be changed from their values $dx_o$ and $dy_o$, taking into consideration the transversal deflection in the $z$ direction, in such a manner that the relations (3), (4), (5) hold:

$$dx = d \cdot \cos \alpha \quad (3)$$

$$dy = d \cdot \cos \beta \quad (4)$$

$$dz = d \cdot \cos \gamma \quad (5)$$

where $\alpha$, $\beta$ and $\gamma$ are the angles of the three-dimensional deflection vector $OP_2$ to the $x$ axis, the $y$ axis and the $z$ axis respectivly. Then the magnitude of the three dimensional deflection vector normal to the model surface remains constant and only in this manner can contour fidelity be assured. As is evident from FIG. 4, the deflection components $dx_o$ and $dy_o$ must then be decreased by the same factor, for, it must be true that $$dy_o/dx_o = dy/dx = \tan \alpha_o$$

Since the sensor housing is rigidly coupled to the feed drive, this change of the deflection components in the $x$ direction and the $y$ direction must be achieved by correction of the corresponding feeding velocity.

Under the assumption that, in the manner described before, the three dimensional deflection vector of the sensing stylus can be kept constant by a corresponding correction of two feed direction velocities, the center of the tool will always move exactly parallel to the model contour with the intended velocity.

Figure 5:
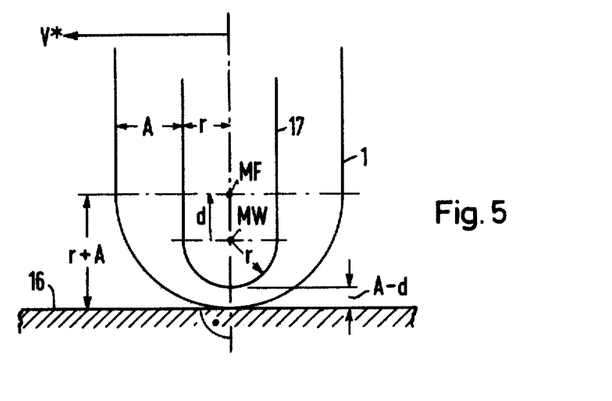
FIG. 5 is a schematic presentation of a sensing stylus scanning a model.

FIG. 5 illustrates this schematically. The sensing stylus 1 has the same shape as the tool 17, in the case shown, a radius milling cutter with a radius $r$. The sensing stylus 1 has a constant offset dimension A relative to the tool 17. The center MF of the sensing stylus 1 therefore moves at a perpendicular distance $r + A$ along the contour of the model 16. The center of the tool 17, MW, likewise moves parallel to the contour of the model, and specifically, at the distance $d$, held constant, from the path of the sensing stylus center MF. Thus, it is found that the cutting edge of the tool moves at a distance A $- d$ parallel to the model contour. The deflection $d$ can now be chosen as desired, but it must have a value different from zero and must not exceed the offset dimension A. For $d = A$, the contours of the machined work piece and the model coincide. But a preceding roughing cut is possible without problem and particularly without exchanging the sensing stylus, a correspondingly smaller deflection being predetermined, and afterwards, the finishing cut, which is accomplished with a deflection $d = A$.

Figure 6:
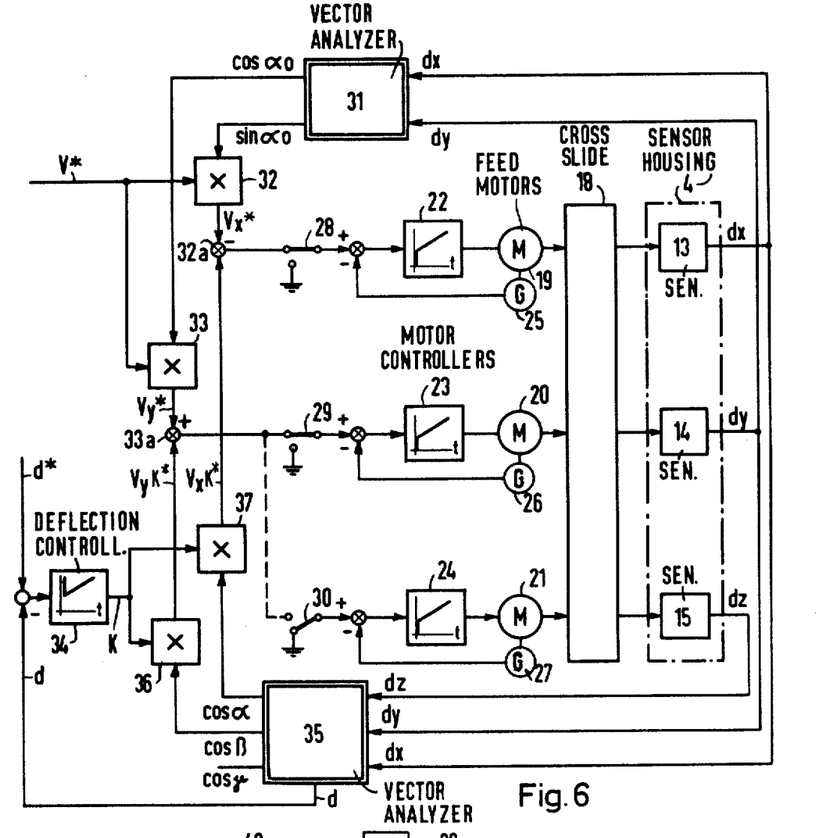
FIG. 6 is a block diagram of a feed control system for outline milling.

FIG. 6 shows the block diagram of a feed control for outline milling in the $x$-$y$ plane. The cross-slide 18, which carries the tool and is shown schematically, is acted upon by feed motors 19, 20 and 21, which are controlled by velocity controllers 22, 23 and 24 associated with them via control elements. The motor controllers 22, 23 and 24 typically will be proportional integral controllers, i.e., they will be formed using amplifiers with appropriate capacitive feedback. The summing junctions shown at the inputs thereto will then simply be the summing junction at the input of an associated amplifier. The actual feeding velocity values $V_x$, $V_y$ and $V_z$ in the individual machine axes are supplied by the measuring transducers 25 to 27, which are, for instance, tachometer generators coupled to the feed motors. The actual or desired values for the feed velocities are fed to the velocity controllers via switches 28, 29 and 30. Since with the embodiment shown, outline milling in the $x$-$y$ plane is to be carried out, the actual value of the feed drive in the $z$ direction is set to zero by connecting the switch 30 to zero or ground potential.

The sensor housing 4, which contains the sensing systems 13, 14 and 15, is rigidly coupled to the tool slide 18. At the outputs of the former, the voltages proportional to the deflections $dx$, $dy$ and $dz$ of the sensing stylus in the individual axes are take off. Of these, the voltages proportional to the deflection components $dx$ and $dy$ in the $x$ and $y$ direction are fed to a vector analyzer 31, which forms, in a manner known per se, according to U.S. Pat. No. 3,710,088, the cosine and sine of the angle $a_o$ between the $x$ axis and the projection $OP_3$ of the deflection vector $OP_2$ (see FIG. 4). The output variables of the vector analyzer 31 are fed to two multipliers 32 and 33, to whose other inputs a variable proportional to the predetermined desired value $V^*$ of the resultant feeding velocity is applied. With the multipliers 32 and 33, the feeding velocity desired values $V_x^*$ and $V_y^*$ are formed according to equations (1) and (2). As noted above in connection with the description of FIG. 4, these desired velocity values remain uninfluenced by a deflection in the $z$ direction, i.e., are independent of a transversal deflection.

For exact contour fidelity it is required that the absolute value $d$ of the three dimensional deflection vector $\bar{d}$ be kept constant. A deflection controller is provided for this purpose. The vector analyzer 35, calculates the actual value of the magnitude of the deflection, $d$, from the components $d_x$, $d_y$ and $d_z$. At the three outputs of the vector analyzer 35, voltages are produced which correspond to the cosine of the angles $a$, $\beta$ and $\gamma$ between the deflection vector and the coordinate axes $x$, $y$ and $z$. Of these, the voltages proportional to $\cos a$ and $\cos \beta$ are fed to multipliers 36 and 37 respectively. The other inputs of these multipliers are connected to the output of the deflection controller 34. The deflection controller 34, which has integrating characteristic, will change its output voltage, which is designated as a correction quantity K, and thereby, add correction values $V_{xK}^* = K \cdot \cos a$ and $V_{yK}^* = K \cdot \cos \beta$ to the feeding velocity desired values supplied by the multipliers 32 and 33 at summing junctions 32 and 33a, until the actual amount of deflection occuring coincides with the predetermined amount $d^*$. The correction values are considerably smaller than the feeding velocity actual values $V_y^*$ and $V_x^*$ themselves and therefore have no noticeable effect on the resultant feeding velocity of the tool.

With the arrangement shown in FIG. 6, the feeding velocity and the deflection can therefore be set independently of one another and independently of any transversal deflection. The contour fidelity is ensured in all cases. The arrangement as per FIG. 6 can also be used as is for machining other planes, e.g., for line milling in the $x$-$z$ plane or in the $y$-$z$ plane. For machining in the $x$-$z$ plane, for instance, the actual value of the feeding velocity controller 23 associated with the $y$ direction would have to be set to zero by actuating the switch 29, and the actual value formerly fed to the same connected via the switch 30 to the input of the feeding velocity controller 24 associated with the $z$ direction. In addition, the deflection voltage $dz$ would have to be fed to the vector analyzer 31 instead of the deflection voltage $dy$, and the output voltage $\cos \gamma$ to the multiplier 36 instead of the output voltage $\cos \beta$. An analogous modification of this connection would have to be made for working in the $y$-$z$ plane.

Figure 7:
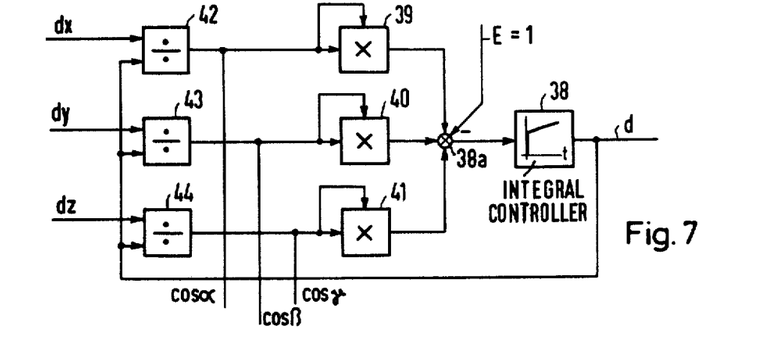
FIG. 7 is a block diagram of a vector analyzer.

The vector analyzer 35 could in principle consist of a device which forms the magnitude $d$ of the deflection vector $\bar{d}$ by taking the square root of the sum of the squares of the three deflection components $dx$, $dy$ and $dz$ and then calculating the individual components from this quantity by division. FIG. 7 shows a circuit which is considerably more accurate than that. It consists of a controller 38 with integrating behavior, in the input circuit of which the sum of the output voltages of three squarers 39, 40 and 41 is compared with a constant d-c voltage E at a summing junction 38a. The d-c voltage E is assumed to have the value 1. The inputs of the squarers 39 and 41 are connected to the outputs of the dividers 42 to 44, to the dividend inputs of which the deflection voltages $dx$, $dy$ and $dz$ are connected and the divisor inputs of which are addressed by the output variable of the controller 38. The latter now changes its output variable $d$ until its input at summing junction 38a is zero, i.e., the relation (6) holds:

$$(dx/d)^2 + (dy/d)^2 + (dz/d)^2 = E^2 = 1 \qquad (6)$$

Then, however, the output variable $d$ corresponds to the magnitude of the spatial deflection vector, formed by the components $dx$, $dy$, $dz$ and at the outputs of the dividers 42, 43 and 44, respectively, voltages are produced which are proportional to the cosine of the angles between the deflection vector and the individual coordinate axes $x$, $y$ and $z$, respectively.

Figure 8:
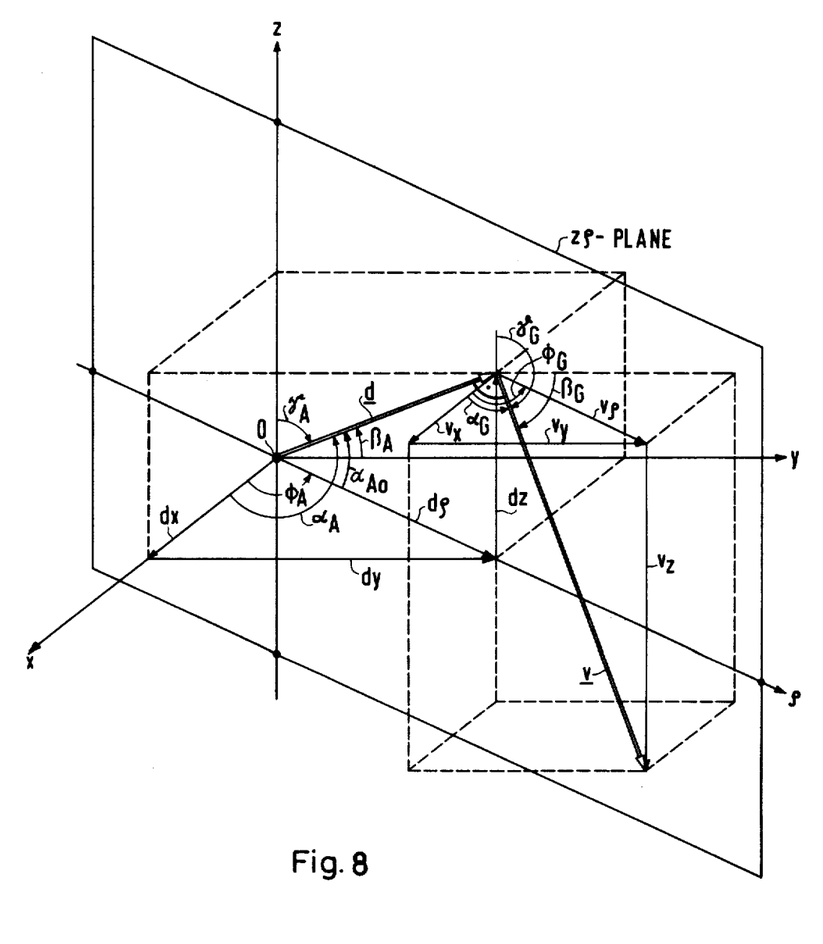
FIG. 8 is a vectorial presentation helpful in understanding the further feature of the present invention for duplicating in a duplicating plane which encloses an angle of rotation with the plane formed by two axis-parallel feed directions.

In the vectorial presentation of FIG. 8, the intersection point of three orthogonal coordinates axes $x$, $y$, $z$ is designated as 0. The coordinate origin 0 coincides, as already explained above, with the center of the hemispherical sensor stylus head in its undeflected position. Contrary to FIG. 4, however, the milling operation is not to take place in a plane which contains two feeding axes but in a $z$-$\rho$ plane which contains the $\rho$ axis and the $z$ axis. The angle of rotation $\phi_A$ exists between the $z$-$\rho$ plane and the $x$-$z$ plane. The deflection vector $d$ makes with the $x$ axis an angle $\alpha_A$, with the $y$ axis an angle $\beta_A$ and with the $z$ axis an angle $\gamma_A$. The deflection component in the $x$ direction is designated as $d_x$, the deflection component in the $y$ direction as $d_y$, the deflection component in the $z$ direction as $d_z$ and the deflection component in the $\rho$ direction with $d\rho$. The velocity component in the $x$ direction is designated as $V_x$, the velocity component in the $y$ direction as $V_y$, the velocity component in the $z$ direction as $V_z$ and that in the $\rho$ direction as $V_\rho$. The velocity vector $V$ makes an angle $\alpha_G$ with the $x$ direction, an angle $\beta_G$ with the $y$ direction, and angle $\gamma_G$ with the $z$ direction. The velocity vector $V$ is at right angles to the deflection vector $d$. Thus, the following relations hold:

$$d_x = d \cdot \cos \alpha_A = d \cdot \sin \gamma_A \cos \phi_A \qquad (7)$$

$$d_y = d \cdot \cos \beta_A = d \cdot \sin \gamma_A \sin \phi_A \qquad (8)$$

$$d_z = d \cdot \cos \gamma_A \qquad (9)$$

$$V_x = V \cdot \cos \alpha_G = V \cdot \sin \gamma_G \cdot \cos \phi_G \qquad (10)$$

$$V_y = V \cdot \cos \beta_G = V \cdot \sin \gamma_G \cdot \sin \phi_G \qquad (11)$$

$$V_z = V \cdot \cos \gamma_G \qquad (12)$$

$$d_\rho = d \cdot \sin \gamma_A \qquad (13)$$

$$V = V \cdot \sin \gamma_G \qquad (14)$$

$$V_x = V \cdot \cos \gamma_A \cos \phi_A \qquad (15)$$

$$V_y = V \cdot \cos \gamma_A \sin \phi_A \qquad (16)$$

$$V_z = -V \cdot \sin \gamma_A = -V \cdot (\cos \alpha_A / \cos \phi_A) = -V \cdot \cos \alpha_o \qquad (17)$$

$$\phi = \phi_A = \phi_G \text{ (i.e., no transversal deflection)} \qquad (18)$$

In case of a velocity vector of opposite direction, it is found that in Eqs. (15), (16) and (17), only the sign is changed.

Figure 9:
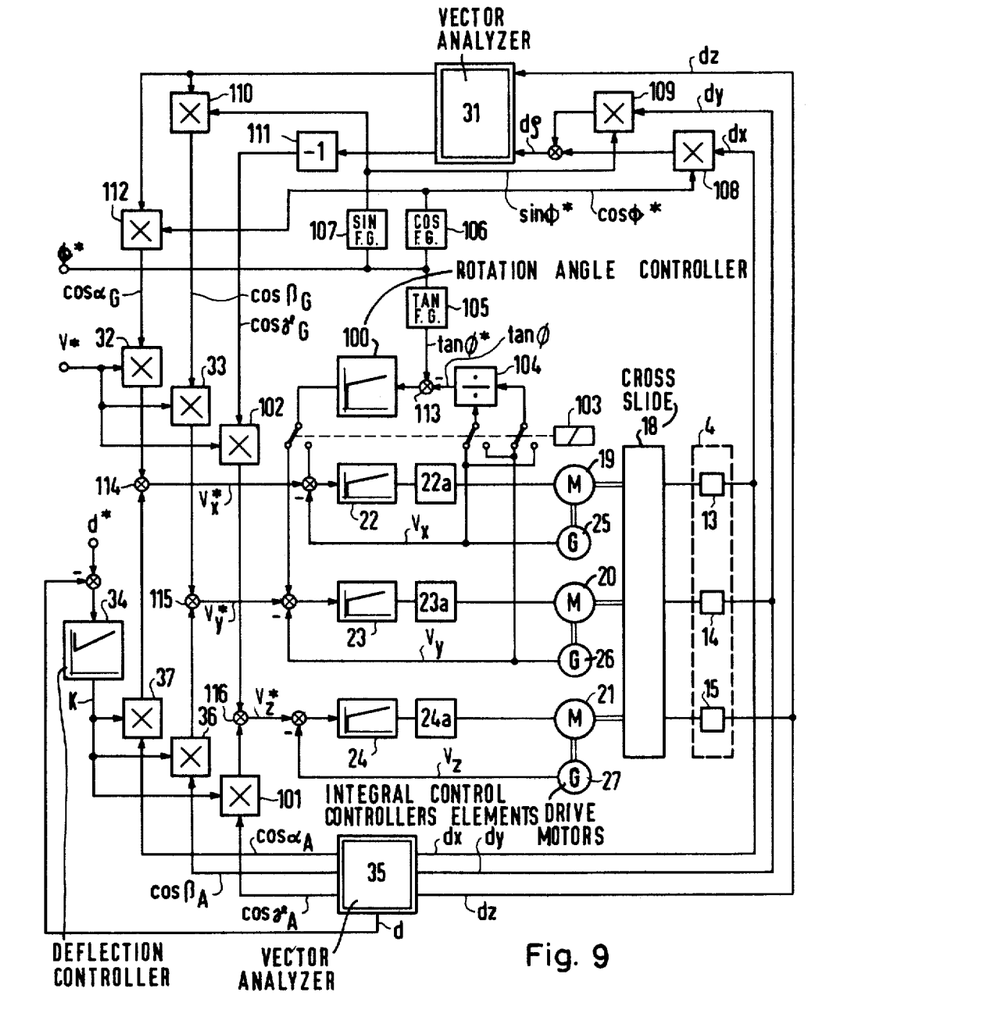
FIG. 9 is a signal flow diagram of the manner in which this feature is implemented.

FIG. 9 shows the signal flow diagram of a feed control for the $z$-$\rho$ plane. The schematically shown cross slide carrying the tool, 18, is acted upon by the feed motors 19, 20, 21, which are controlled via control elements 22a, 23a, 24a i.e., power amplifiers. The actual values of the feeding velocities $V_x$, $V_y$ and $V_z$ are supplied in the individual machine axes by measuring transducers 25, 26 and 27, which may be, for instance, tachometer generators connected to the feed motor.

Rigidly coupled to the tool slide is a sensor housing 4, which contains the sensing systems 13, 14 and 15. At the outputs of the latter, the voltages $d_x$, $d_y$ and $d_z$ proportional to the deflection components of the sensing stylus in the individual axes are taken off.

So that, as is required for exact contour fidelity, the magnitude of the three dimensional deflection vector $d$ is kept constant, a deflection controller 34 is provided, into which a voltage for the desired amount of deflection $d^*$ is set as the desired value. The actual value $d$ for the amount of the deflection vector is formed in a first vector analyzer 35, which calculates the actual value $d$ from the components $dx$, $dy$, $dz$. These inputs are provided to the summing junction at the input of the controller 34 in the manner explained above in connection with FIG. 7. At the other three outputs of the vector analyzer 35 are present voltages which correspond to the cosine functions of the angles $\alpha_A$, $\beta_A$ and $\gamma_A$ between the deflection vector $d$ and the coordinate axes $x$, $y$, $z$. The cosine functions $\cos \alpha_A$, $\cos \beta_A$ and $\cos \gamma_A$ at the outputs of the vector analyzer 35 are fed, respectively, to one of the inputs of multipliers 37, 36 and 101, the second inputs of which are the correction signal K of the deflection controller 34. The deflection controller 34, which has integrating behavior, changes its output voltage, which acts as the correction variable K, until the actually occurring magnitude d of the deflection vector $d$ coincides with the predetermined desired value $d^*$. The output voltages of the multipliers 37, 36 and 101 are connected to the velocity controllers 22, 23, 24 via the summing points 114, 115 and 116. The correction values present at the outputs of the multipliers 37, 36 and 101 are substantially smaller than the desired velocity values themselves and therefore have no noticeable effect on the resultant feeding velocity of the tool.

The deflection components $d_x$, $d_y$ and $d_z$ are transformed in a second vector analyzer 31 and in a computing circuit made up of elements 106 to 112 into the cosine component of the direction angle for the velocity vector. Function generators 106 and 107 form voltages for the cosine component and sine component, respectively, of the desired angle of rotation $\phi^*$ from a voltage input proportional to the desired angle of rotation $\phi^*$. The voltage proportional to the cosine component of the desired angle of rotation $\phi^*$ is multiplied by the deflection component $d_x$ in a multiplier 108 and the sine component by the deflection component $d_y$ in a further multiplier 109. The output voltages of the two multipliers 108 and 109 are added and their sum is fed to the input of the second vector analyzer 31. The sum voltage represents the deflection component $d_\rho$ in the $\rho$ direction. The deflection component $d_z$ is likewise fed to the input of the second vector analyzer 31.

The output voltage at the lower output of the second vector analyzer 31, after its sign is inverted in an inverter stage 111, represents a desired value for the cosine component of the direction angle of the velocity vector with respect to the $z$ axis. It is multiplied in a multiplier 102 by the predetermined amount $V^*$ for the desired feeding velocity and is fed to the summing point 116 at the input of the velocity controller 24 for the $z$ axis. The desired value $V_z^*$ for the velocity component in the $z$ direction is therefore formed by the sum of the output voltages of the multipliers 101 and 102.

The output voltage at the upper output of the second vector analyzer 31 is multiplied in two multipliers 110 and 112 by the sine component $\sin \phi^*$ and the cosine component $\cos \phi^*$, respectively, of the desired angle of rotation $\phi^*$. The output voltages of the multipliers 110 and 112 represent the desired values for the cosine components of the direction angles $\beta_G$ and $\alpha_G$ of the velocity vector with respect to the $y$ axis and the $x$ axis. The output voltages of the multipliers 110 and 112 are multiplied in the multipliers 33 and 32 by the predetermined amount $V^*$ for the desired feeding velocity and added to the output voltages of the multipliers 36 and 37 in the summing points 115 and 114. The respective sum voltages form the desired value voltages $V_y^*$ and $V_x^*$ for the velocity components in the $y$ axis and the $x$ axis. They are fed to the velocity controllers 23 and 22 of the drives in the $y$ axis and the $x$ axis.

In the embodiment of FIG. 9, the desired value $V_x^*$ for the velocity controller 22 for the feed drive 19 in the $x$ axis is therefore formed by the sum of the output voltages of the two multipliers 32 and 37. The desired value $V_y^*$ for the velocity controller 23 of the feed drive 20 for the $y$ axis is formed by the sum of the output voltages of the two multipliers 33 and 36, taking the output voltage of a rotation angle controller 100 into consideration.

For correcting inaccuracies of the computing circuit, a rotation angle controller 100 is provided, at the comparison point 113 of which the difference of a voltage giving the tangent function of the desired angle of rotation $\phi^*$ and the output voltage of a divider 104 is formed. The rotational angle controller will be a proportional integral contoller, i.e., a PI controller. The output of the divider 104 has a negative sign so that at the summing junction 113, which once again can simply be the summing junction at the input of the amplifier used in controller 100, it will be differenced with output of the function generator 105. The tangent function of the desired angle of rotation $\phi^*$ is formed in a function generator 105 from a voltage which is proportional to the predetermined desired rotation angle $\phi^*$. To the divider 104 are fed the feeding velocities $V_x$ in the $x$ axis and $V_y$ in the $y$ axis, which have been picked up by the velocity measuring transducers 25 and 26. The divider 104 therefore forms the tangent of the rotation angle $\phi$ as the quotient of $V_y$ and $V_x$. The output voltage of the rotation angle controller 100 is applied as one input to the summing junction at the input of the velocity controller 23 for the feed drive in the $y$ direction added to the difference between the input $V_y^*$ which is the desired velocity value and $V_y$, the actual velocity value. Thus, the output of the rotation angle controller 100 adds a correction to the normal control signal which is formed at the input of the controller 23 by taking the difference between the desired velocity and actual velocity.

The inputs of the divider 104 connected to the velocity transducers 25 and 26 and the output of the rotation angle controller 100 are conducted via the double throw contacts of a coordinate selection switch 103. In the example shown in the drawing, it is assumed that the desired rotation angle $\phi^*$ is smaller than 45°. To the divider 104, the feeding velocity $V_y$ in the $y$ direction is fed as the dividend and the feeding velocity $V_x$ in the $x$ direction as the divisor. Accordingly, the output voltage of the rotation angle controller 100 is connected to the comparison point of the velocity controller 23 for the drive 20 in the $y$ axis. If a rotation angle $\phi^*$ larger that 45° is desired, the coordinate selection switch 103 is reversed. Then, the feeding velocity $V_x$ in the $x$ direction is fed to the divider 104 as the dividend and the feeding velocity $V_y$ in the $y$ direction as the divisor. The output voltage of the rotation angle 100 is connected to the comparison point of the velocity controller 22 for the drive 19 in the $x$ axis. In such a coordinate switching system, still further switching in the rest of the control system may become necessary.

Figure 10:
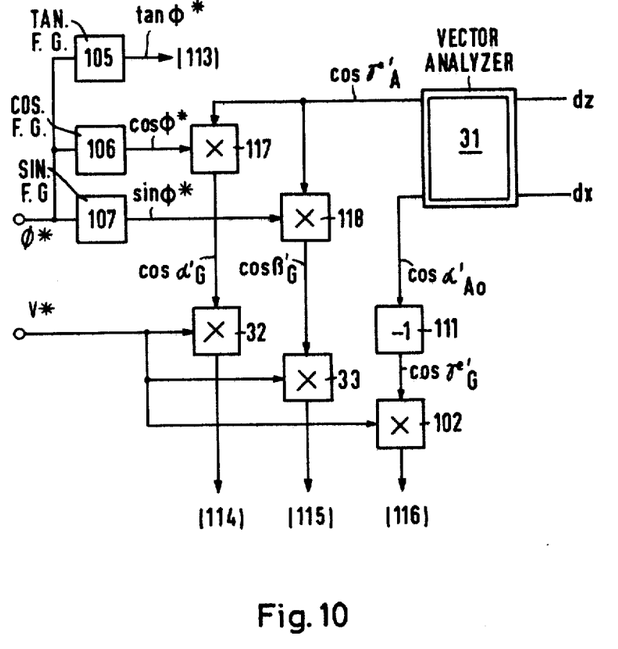
FIG. 10 is a circuit diagram of a simplified computing circuit for the duplicating control apparatus of FIG. 9.

In place of the computing circuit with the elements 106 to 112, which permits a mathematically exact solution, an approximate solution may be sufficient for many applications. FIG. 10 shows schematically a simplified computing circuit for such an approximate solution.

The voltage indicating the rotation angle $\phi^*$ again is transformed in function generators 106 and 107 into voltages for the cosine component cos $\phi^*$ and the sine component sin $\phi^*$ of the desired rotation angle $\phi^*$. The deflection components $d_x$ and $d_z$ are fed directly to the second vector analyzer 31. The output voltage at the lower output of the second vector analyzer 31 is considered as the desired value for the cosine component of an approximate direction angle $\gamma_G'$ of the velocity vector with respect to the z-axis and is fed to the multiplier 102 via an inverting stage 111. The output voltage at the upper output of the second vector analyzer 31 after inversion in an inverter 111 is multiplied in multipliers 117 and 118 by the voltages for the cosine component and the sine component, respectively, of the desired rotation angle $\phi^*$. The output voltages of the two multipliers 117 and 118 are considered as desired values for the cosine components of approximate direction angles $\alpha_G'$ and $\beta_G'$ of the velocity vector with respect to the $x$ axis or the $y$ axis, respectively and fed to the multipliers 32 and 33. The output voltage of the multiplier 32 is fed to the summing point 114, the output voltage of the multiplier 33 to the summing point 115 and the output voltage of the multiplier 102 to the summing point 116.

The approximation error of the coordinate rotation caused by the simplified computing circuit shown in FIG. 10 is compensated by the rotation angle controller 100. The intervention of the rotation angle controller 100 is therefore greater than in the computing circuit shown in FIG. 9 for a mathematically exact solution of the coordinate rotation.

What is claimed is:

1. In electrical duplicating control apparatus, including a sensor which scans a model mechanically and comprises a sensing stylus and orthogonally operating coil sensing systems, means for developing velocity control signals for the individual axes feed drives in the individual machine axes from the output voltages thereof, and means to feed appropriate correction signals to the feed drives to maintain a predetermined amount of the deflection of the sensing stylus, the improvement comprising:

a. a sensing stylus having three sensing systems which operate in three mutually perpendicular directions;
   b. a first vector analyzer having as inputs the outputs of said three sensing systems and forming as outputs, voltages proportional to the respective cosines of the direction angles ($\alpha$, $\beta$, $\gamma$) of the three dimensional deflection vector of the stylus relative to three orthogonal machine axes and the magnitude of the three dimensional deflection vector;
   c. a deflection controller having as an input the difference between a desired value and an actual value which is the magnitude of the three dimensional deflection vector;
   d. first and second multipliers each having as one input the output voltage of said deflection controller and as second inputs respectively separate ones of the cosine outputs of the first vector analyzer and forming as outputs two correction signals;
   e. a second vector analyzer having as inputs the two output voltages of the sensing systems which operate in the plane formed by two desired feed directions and providing output voltages which correspond to the sine and cosine of the deflection angle in that plane; and f. third and fourth multipliers having as first inputs the desired feeding velocity and as second inputs respectively the outputs of said first and second multipliers and providing as outputs desired feed velocity signals in that plane.

2. Apparatus according to claim 1, wherein said first vector analysis comprises three dividers having voltages proportional to the sensing stylus deflections as dividend inputs; means for squaring the output voltages of said dividers; and a proportional integral controller having a summing junction at its input for summing the outputs of said squaring means and for generating the difference between said sum with a constant quantity, the output of said controller being the divisor inputs of said dividers.

3. Apparatus according to claim 1, and further comprising means for generating the difference of said desired velocity signals and corresponding correction signals and for providing the results as desired values to said means for developing velocity control signals.

4. In electrical duplicating control apparatus, including a sensor which scans a model mechanically and comprises a sensing stylus and orthogonally operating coil sensing systems, means for developing velocity control signals for the individual axes feed drives in the individual machine axes from the output voltages thereof, and means to feed appropriate correction signals to the feed drives to maintain a predetermined amount of the deflection of the sensing stylus, the improvement comprising:

a. a sensing stylus having three sensing systems which operate in three mutually perpendicular directions;

b. a first vector analyzer having as inputs the outputs of said three sensing systems and forming, as outputs, voltages proportional to the respective cosines of the direction angles of the three dimensional deflection vector of the stylus relative to three orthogonal machine axes and the magnitude of the three dimensional deflection vector;

c. a deflection controller having as inputs a desired value and an actual value which is said magnitude of the three dimensional deflection vector;

d. a second vector analyzer having as inputs two voltages derived from the outputs of said sensing system which define two desired feed directions in a plane in which work is desired to be done and providing output voltages which correspond to the sine and cosine of the deflection angle of that plane;

e. a computing circuit associated with said second vector analyzer having as one input a voltage indicating a desired rotation angle $\phi^*$ said angle being the angle between a feed drive plane containing two of the machine axes and a plane in which work is desired to be done, said computing circuit having as additional inputs the outputs of said second vector analyzer and providing as outputs the respective cosines of the three dimensional deflection vector in a plane rotated by said angle $\phi$ from said feed drive plane and also providing an output proportional to the tangent of $\phi^*$;

f. first, second and third multipliers each having as one input the output voltage of said deflection controller and the second input respectively separate ones of the cosine outputs of said first vector analyzer and forming as outputs three correction signals;

g. fourth, fifth and sixth multipliers having as first inputs the desired feeding velocity and as second inputs respectively the cosine outputs of said computing circuit;

h. means for summing the respective outputs of said first, second and third and fourth, fifth and sixth multipliers and providing the respective results as velocity control signals to the feed drive for the individual axes;

i. a rotation angle controller for correcting the direction angle of the velocity vector having as a desired value input said output proportional and tan $\phi^*$, the output voltage of which is coupled as an additional input for one axis of the means for developing velocity control signals; and j. a divider having as input signals voltages representing the actual feeding velocities in said feed plane for forming the quotient thereof, said quotient output being provided as an actual value input to said rotation angle controller.

5. Apparatus according to claim 4 wherein said computing circuit includes means for generating the sine, cosine and tangent of said rotation angle $\phi^*$.

6. Apparatus according to claim 5 wherein said computing circuit includes two multipliers each having as one input one output of said vector analyzer and as a second input the sine and cosine outputs of said means for generating the sine and cosine and said angle $\phi^*$ and an inverter having as an input the other output of said vector analyzer, the respective outputs of said two multipliers and said inverter providing said respective cosines of said three dimensional deflection vector.

7. Apparatus according to claim 4 wherein said computing circuit includes;

a. first and second function generators each having as an input a voltage said voltage representing the desired rotation angle $\phi^*$ and having as respective outputs voltages representing the cosine and sine of said angle;

b. an inverter having as its input one output of said second vector analyzer; and c. seventh and eighth multipliers each having as one input one of the output voltages of said second vector analyzer and as second inputs the outputs of said first and second function generators respectively; and means for providing inputs to said second vector analyzer comprising:

d. ninth and tenth multipliers having as first inputs said cosine component and said sine component voltages respectively and each having as a second input a different one of the output voltages of the two of said sensing systems for said feed drive plane;

e. means for summing the outputs of said ninth and tenth multipliers and coupling said sum as an input to said second vector analyzer, the second input to said second vector analyzer being the output of the third sensing system.

8. Apparatus according to claim 4 and further including coordinate selection means for selecting the two feed velocity axes which define said feed drive plane.

9. Apparatus according to claim 8 wherein said coordinate selection means comprise a switch for selectively coupling different pairs of said actual feeding velocities as inputs to said divider and for coupling the output of said rotational angle controller as an additional input to different ones of said means for developing velocity control signals.

* * * * *